Patented June 10, 1952

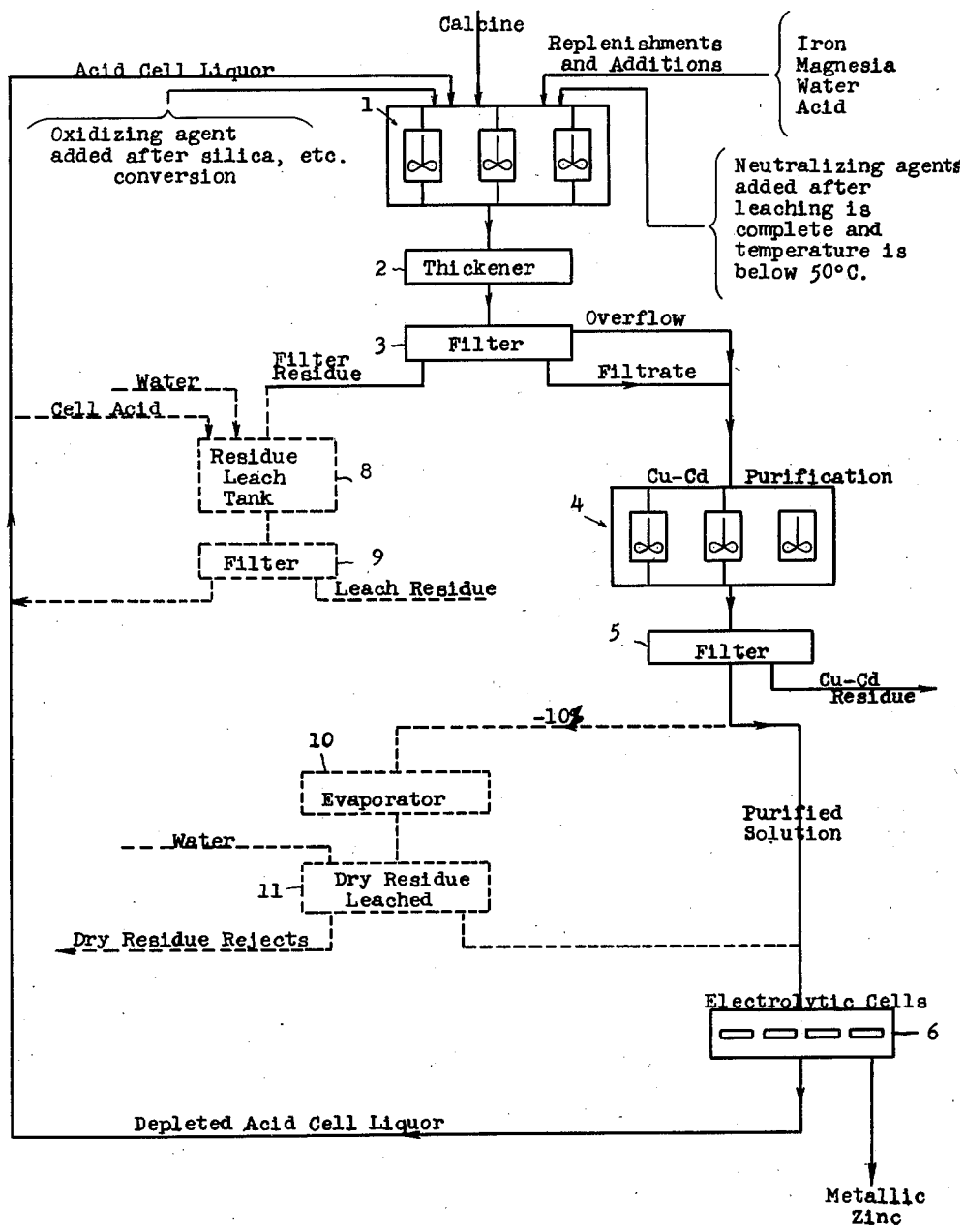

2,599,816

UNITED STATES PATENT OFFICE 2,599,816

PURIFICATION OF ZINC ELECTROLYTES

John T. Ellsworth, Collinsville, Ill.; Mildred Ellsworth administratrix of said John T. Ellsworth, deceased Application September 22, 1948, Serial No. 50,625

12 Claims. (Cl. 204—119)

This invention relates to the preparation and purification of zinc-bearing electrolytes from which zinc is to be recovered by electrolysis, and particularly to the treatment of such electrolytes for the removal of soluble impurities which would have a deleterious effect.

In the usual process of electrolytically recovering zinc from zinciferous materials, the zinciferous material, such as a basic calcine of roasted zinc concentrate, is leached with a sulfuric acid solution to form a leach liquor which is neutralized and then purified with respect to iron, and with respect to copper and cadmium and other impurities which follow their reaction. The purified solution is then subjected to electrolysis during which the zinc is precipitated out of the solution and a corresponding amount of sulfuric acid is generated in the electrolytic cells. The cell liquor, depleted in zinc and containing the generated sulfuric acid, is returned to the leaching tanks for treatment of further amounts of the zinciferous material. Thus, the cell liquor or solvent is cyclic, in that nearly all of it is used over and over again for extracting zinc from the zinciferous material, with only such replacement of acid and water as are necessary to replace natural losses, and losses occurring as a result of reaction of the sulfuric acid with components of the zinciferous material other than the zinc compounds.

Iron present in the leach liquor is in the form of ferrous sulfate. This ordinarily is oxidized to ferric sulfate by air blowing, while the leach liquor is hot, or by the addition of an oxidizing agent such as potassium permanganate, so that when the solution is neutralized and made slightly basic, the iron present as an impurity will precipitate in a coagulated form as ferric hydrate. As the coagulated ferric hydrate settles it carries along a limited amount of gelatinous silica which separates from the solution on neutralization. In this manner a considerable reduction of the stickiness due to the presence of the gelatinous silica, is also obtained.

The copper and cadmium impurities are removed by agitating the leach filtrate with metallic zinc dust which precipitates such metallic impurities from the solution.

The zinc calcine or other zinciferous materials contain certain soluble compounds which are not removed with the iron, copper and cadmium and which tend to build up in the cyclic solution to concentrations that deleteriously effect the preparation of the zinc-bearing electrolyte and the electrodeposition of zinc therefrom. For simplicity these compounds are herein referred to as "harmful soluble salts," and while referred to as "soluble," they, in reality, may be only slightly soluble in the cyclic solvent solution, but due to such low solubility therein, readily build up to their saturation points. These harmful soluble salts vary with the character of the zinciferous material undergoing treatment, but always includes silica, which may be present to such an extent that the leach liquor obtained from them may contain from 0.1 gram to 5 grams per liter, or more, and usually contains alumina, which may be present in amounts such that the leach liquor will contain up to 5 grams per liter, and iron.

When the concentration of the harmful soluble salts in the solution approaches or reaches their saturation points, they may be in part dispersed throughout the solution in a colloidal or gelatinous state. This is particularly true with respect to silica and alumina which, on neutralization of the leach liquor or pulp, precipitate and separate from it in a gelatinous or colloidal form, the alumina precipitating as aluminum hydroxide. The presence of such harmful soluble salts in too high a concentration reduces the efficiencies of the normal chemical reactions, particularly the removal of copper and cadmium, the filtering of both the leach and purification residues, and the electrodeposition of the zinc. Since the filtration of the leach and purification residues is greatly retarded by the presence of the gelatinous or colloidal impurities, a large amount of stray zinc solution is retained in the rejected residue. Consequently, a fairly large percentage of zinc content of the leach liquor is lost at this point, since it is difficult to separate efficiently by a water or acid wash.

In my application Serial No. 723,209, now abandoned, filed January 20, 1947, as a continuation-in-part of my application Serial No. 431,055, filed February 16, 1942, now Patent No. 2,454,142, I have disclosed and claimed a method of removing the harmful soluble salts from the cyclic solvent solution by the addition of an agent or agents, usually magnesia, which will combine with alumina and silica present in the leach liquor to form a granular, insoluble complex or compound which is easily removed by filtration, or which causes a change in the colloidal precipitate such that it does not interfere with the filtering of the leach and purification residues.

As a result of further investigations, I have found that the dissolving of the zinc from the zinciferous material and the removal of harmful soluble salts by the addition of suitable precipitation agents is more effective and complete if during the leaching the acid leach is not allowed to go below 10 grams per liter of acid, and, agitation of the pulp of the cyclic solvent solution and the zinciferous material is continued for a minimum of about two hours without use either of the heat of reaction between the acid and the zinciferous material or heat applied extraneously. The agitation should be conducted for a substantial length of time after the temperature of the pulp has dropped to below 50° C. and preferably until the temperature of the pulp has dropped to about 20° C. or 25° C., and until the colloidal silica and alumina is converted to a readily-filterable, granular form. With such prolonged agitation, it is possible, with the addition of suitable addition or precipitation agents, to remove iron as well as alumina and silica from the leach liquor without loss, during the usual thickening, filtering, and washing operations, of an appreciable amount of the zinc contained in the leach liquor. That is particularly true when the oxidation of ferrous iron is delayed for a length of time sufficient to allow most of it to react or combine with silica and added lime to form a granular, insoluble and readily filterable complex or compound of iron, lime, and silica.

Leaches of zinciferous material attain a temperature of about 65° C. or more, as a result of the reaction of the acid in the cyclic solution with the zinciferous material. In small leaches, the heat of reaction may be dissipated and the pulp cooled to about 25° C. within about two hours. Larger leaches will take three hours or longer. Thus, the extraction of the zinciferous material with the cyclic solvent solution will take place for a substantial length of time below 50° C., which I have found to be most important. Preferably, the agitation of the pulp should continue for at least one hour before it is neutralized and, for at least two hours, and preferably at least three hours, after it has been neutralized and has cooled to below 50° C., and always should be continued until the temperature of the pulp has dropped to below 30° C., as a readily filterable residue containing the iron, as well as other impurities present, will not be obtained until the temperature has dropped to that extent. Ordinarily, the agitation is continued until the temperature has dropped to about 25° C. During the agitation the temperature of the pulp is permitted to drop naturally and no attempt is made to apply heat or to hold the temperature at any point.

At temperatures of about 50° C. the silica and alumina which are present will be in gelatinous state so that the residues filter with great difficulty and entrap a substantial proportion of the zinc. At temperatures below about 50° C. the alumina and silica will show a colloidal form for a substantial period of time, but when the agitation is continued for a sufficient length of time, such as for two hours or more after the pulp has cooled to below 50° C., and in the presence of suitable addition or precipitation agents, a high percentage of the gelatinous silica and alumina is converted into a granular insoluble form which readily may be separated by filtering.

After the calcine or other zinciferous material has been leached with the cyclic solvent solution until the acid content of the leaching solution has been reduced to about 1% and the temperature of the pulp has been reduced to about 45° C., the leach liquor is neutralized by the addition of magnesia, or additional calcine. The neutralized leach liquor should contain sufficient calcium sulfate and magnesium sulfate to combine with the silica, alumina and iron present. As the leach liquor ordinarily will not contain sufficent magnesium sulfate and calcium sulfate for that purpose, the leach liquor ordinarily will be neutralized with magnesia and lime. Lime which is added to neutralize the leach liquor, should not be added until the temperature of the leach liquor has dropped to 50° C. and preferably not until the temperature has dropped to about 45° C., because at temperatures of 50° C. or higher, the zinc content of the leach liquor will react with the lime to form a precipitate from which the zinc content is not readily recoverable, with resultant loss of such zinc from the solution. However, at temperatures of about 45° C. or lower reaction between the lime and the zinc content of the leach liquor is negligible and practically no zinc will be precipitated from the solution by the lime and thereby lost.

The use of both lime and magnesia for neutralizing the leach liquor is preferred as the lime will combine with the silica and iron to form a granular, insoluble compound or complex of iron, lime and silica; while the magnesia will combine with the alumina and silica to form a granular, insoluble compound or complex of alumina, magnesia and silica. If magnesia were used exclusively for neutralizing the acid of the leach liquor, not only would the complex or compound containing the iron not be formed, but the solution usually would contain an excess of the amount of magnesia necessary to form the alumina-magnesia-silica compound or complex, and the magnesia would build up to an undesirable amount in the cycle, with the result that the solution would be too basic and some zinc would be precipitated during the conversion step, either as hydroxide or some indeterminate basic complex.

As the surface portion of the lime particles react with the acid of the leach liquor to form insoluble coatings of calcium sulfate, and as lime tends to lump or ball up, the lime preferably is added in finely divided form intermittently in small amounts. At first only sufficient lime is added to neutralize the acid. Thereafter, additions are made to replace the calcium sulfate which is withdrawn from the solution by reaction or combination with the iron or silica to form the granular, insoluble iron-lime-silica compound or complex and to provide an excess of about 1 gram per liter to always insure that lime or calcium sulfate is present for reaction or combination with the iron and silica to form a granular, insoluble iron-lime-silica compound or complex.

Lime, when added to the leach liquor at a temperature of 45° C. or lower, is a particularly good neutralizing agent as the calcium sulfate formed during the neutralization of the acid enters the system and is available for reaction or combination with the iron and silica to form a granular, insoluble compound or complex. Gypsum crystals also may be added to the leach liquor for this purpose.

As the magnesia does not so readily react with the zinc content of the said leach liquor, it may be added thereto before the temperature has dropped to below 50° C. and preferably, is added in such amount as to maintain a content of from 2 to 4 grams per liter in the solution. This, along with the maintaining of a slight excess of lime is a simple and easy way to maintain the proper basicity of the leach liquor. It also insures the presence of magnesia for the formation of the alumina-magnesia-silica compound or complex. Excess basicity must be avoided, because if the solution becomes too basic zinc compounds will form which are insoluble, and their zinc content will be lost.

The presence of the magnesia is necessary to react or combine with the alumina and silica to form the granular, insoluble magnesia-alumina-silica complex. As that compound or complex forms more readily, and as the iron-lime-silica compound or complex does not form substantially until the solution is made more basic, I prefer to first add sufficient magnesia to combine or react with the alumina and silica to form the granular, insoluble alumina-magnesia-silica compound or complex, and later to add the lime to complete the neutralization and to form the granular, insoluble iron-lime-silica compound or complex. If desired, the magnesia may be added during the leaching of the calcine or other zinciferous material, but the lime should preferably not be added until the temperature of the leach liquor has dropped to below 50° C. The addition of the magnesia and lime can be made in the same leaching tank, successively, or the leach liquor may be filtered from the residue remaining from the leaching operation, and the lime added to the leach filtrate. However, I prefer to add the magnesia and lime successively in the leach tank.

Calcine is not effective to form either the alumina-magnesia-silica or the iron-lime-silica compound or complex, and when added to the leach liquor performs merely a neutralizing function.

After the neutralization of the leach liquor begins, the pulp should be agitated for at least two hours, and preferably for three hours or longer. During this period no heat is added and no attempt is made to retain the heat of reaction between the acid and zinciferous material, the temperature being permitted to drop naturally and gradually until it is below 30° C., and preferably is down to 25° C. or lower, if convenient.

As soon as the leach liquor is neutralized, some of the silica will begin to separate in a gelatinous form. However, if sufficient lime and magnesia are present, most of it will combine with lime and iron, and with the magnesia and alumina, to form granular, insoluble compounds or complexes, and thereby be readily removable from the system by filtration.

As the reaction or combination of the silica and the calcium sulfate takes place with the iron while it is in the ferrous state to form the iron-lime-silica compound or complex, the oxidation of the ferrous sulfate of the solution is postponed until after the formation of the iron-lime-silica and the alumina-magnesia-silica compounds or complexes have been completed. However, as it is necessary to completely precipitate the iron from the solution because of its deleterious effect during the purification of the leach liquor with respect to the copper and cadmium, and during the electrolytic operation, and also because arsenic and antimony are simultaneously removed, the oxidation of the ferrous iron should take place as soon as the reaction or combination of the ferrous iron with the lime and silica seems to be complete, and before metallic zinc dust is added to the leach liquor to separate copper and cadmium therefrom.

The invention will be further described in connection with the accompanying flow sheet which is illustrative of one method of carrying out the invention.

Zinciferous material in the form of a roasted zinc concentrate, or calcine, is added to a battery of leaching tanks 1 and sufficient depleted electrolyte or acid cell liquor added to react with the zinc content of the calcine, and to leave an excess of about 1% of acid. The pulp of calcine and acid cell liquor in each leach tank is agitated for about one and one-half hours, when substantially all the zinc content of the calcine will have been dissolved by or reacted with the acid of the cell liquor, and the acid content of the cell liquor will have been reduced to slightly above 1%.

Calcines will vary with respect to the amounts of nonzinciferous material which they contain. If the particular calcine being treated does not contain sufficient iron to form the granular, insoluble iron-lime-silica compound or complex referred to above, and leave a slight excess for oxidation to ferric hydrate, sufficient ferrous iron for that purpose, usually in the form of ferrous sulfate, is added during the leaching. However, most calcines will contain ample iron and the addition of ferrous sulfate ordinarily is not necessary. During the leaching of the calcine, I also add sufficient magnesia to maintain a magnesium sulfate content in the leaching liquor of about 3 or 4%, calculated as MgO, and add sufficient water and acid to make up for that lost during the cycle.

After the leaching of the calcine has been completed and the temperature of the leach liquor has dropped to about 45° C., sufficient lime in finely divided form is gradually added to neutralize the remaining acid and, thereafter to replenish that which combines with the iron and silica to form the iron-lime-silica compound or complex, and the agitation of the pulp continued for about three hours, or until the formation of the granular, insoluble compounds or complexes of iron, lime and silica, and alumina, magnesia and silica is complete, at which time the temperature of the leach liquor will have dropped to between about 20° C. and 25° C. Sufficient oxidizing agent, such as potassium permanganate, is then added to each leach tank to oxidize the remaining ferrous sulfate to ferric sulfate, which precipitates in coagulated form, as ferric hydrate, and, as it settles, carries along most of the gelatinous silica which did not combine to form the insoluble complexes with the iron and lime, and with the alumina and magnesia.

A small amount of calcine preferably is added to neutralize any acid generated as a result of the oxidation of the ferrous sulfate.

The pulp is then passed to a thickener 2 and filter 3, where it is decanted, thickened and filtered in accordance with the usual procedure. The filtering removes the leach residue along with the granular, insoluble complexes of iron, lime and silica, and alumina, magnesia and silica, as well as the coagulated ferric hydrate and gelatinous silica carried along with it, and all other matter not soluble in the filtrate.

The filtrate is then passed to a battery of tanks 4, where it is agitated with metallic zinc dust for precipitation of copper and cadmium. It is then filtered in a filter 5 for the removal of the precipitated copper-cadmium residue, and the purified filtrate then passed to the electrolytic cells 6, where deposition of the zinc content of the electrolyte takes place. After the electrolysis has proceeded to the stage where the electrolyte is so depleted with zinc that electrolysis no longer is efficient, the depleted electrolyte is withdrawn and passed back to the leaching tanks 1 for the leaching of further amounts of calcine.

The residue from the filter 3 may, if desired, be conveyed to a tank 8 where it is leached with cell acid, or water, for the recovery of the iron which was precipitated as ferric hydrate, as well as for the recovery of any zinc which precipitates as zinc hydrate. The leach residue is separated from the leach liquor in the filter 9 and the leach liquor or filtrate added to the acid cell liquor being returned to the leach tanks. As most of the silica was rendered insoluble by combination with iron and lime, and with the alumina and magnesia, the small amount returned to the cycle with the leach liquor or filtrate from the filter 9 will not be excessive.

If desired, the improvements in the purification of the zinc electrolyte may be combined with the method of purifying such electrolytes disclosed and claimed in my aforesaid patent, where purification is obtained by withdrawing and evaporating to dryness a small amount of the electrolyte and then leaching the dry residue with an equal amount of water to pick up the zinc, which is soluble, while leaving the harmful salts which are rendered insoluble by the evaporation of the residue. When that method of purification is combined with the present method, up to 10% of the purified electrolyte leaving the filter 5 is passed to an evaporator 10 where it is evaporated to dryness, after which the dry residue is leached in a leach tank 11 with an amount of water equal to that which was evaporated from the electrolyte in the evaporator 10, for the recovery of its zinc content. The leach liquor from the leaching tank 11 containing the recovered zinc is added to the electrolyte prior to its introduction into the electrolytic cells 6.

It will be understood that where reference has been made herein, and is made in the appended claims, to the solution or to the granular, insoluble complexes containing magnesia or lime, those compounds are given as reported by analyses of the complexes. While the magnesium and calcium must be present in the solution in the form of their respective sulfates, the actual chemical formula of the complexes is unknown; likewise with respect to the iron, alumina, etc.

The prolonged agitation of the pulp of zinciferous material and the leaching liquor with the magnesia and lime at temperatures below 50° C., together with the postponement of the oxidation of ferrous iron which does not react or combine with the lime and silica to form the iron-lime-silica compound or complex, until after the conversion of the silica and alumina to a granular, readily-filterable form and until after the formation of the iron-lime-silica complex and the complex of alumina, magnesia and silica have been completed, results in a much better recovery of the acid-soluble zinc content of the zinciferous material and the production of a zinc electrolyte which contains much less of the harmful soluble salts.

I claim:

1. In the method of recovering zinc from zinciferous materials involving the leaching of the zinciferous materials with a cyclic sulfuric acid solution to form a zinc-containing solution which subsequently is subjected to electrolysis for the electrodeposition of zinc therefrom; the improvement in reducing, prior to electrodeposition, the concentration in the solution of soluble salts which exert a harmful effect during electrolysis when present in too high a concentration, which comprises neutralizing the solution by the addition thereto of lime and magnesia in addition to any lime or magnesia originally contained in the zinciferous material, the lime being added to the solution while the solution is at a temperature below 50° C. but not substantially below 20° C., and agitating the solution after the addition of lime and while it is at said temperature for a period of at least two hours and until iron and at least the major portion of silica and alumina present in the solution in gelatinous form are converted to readily-filterable, granular complexes of iron, lime and silica, and alumina, magnesia and silica.

2. In the method of recovering zinc from zinciferous materials involving the leaching of the zinciferous materials with a cyclic sulfuric acid solution to form a zinc-containing solution which subsequently is subjected to electrolysis for the electrodeposition of zinc therefrom; the improvement in reducing, prior to electrodeposition, the concentration in the solution of soluble salts which exert a harmful effect during electrolysis when present in too high a concentration, which comprises neutralizing the solution by the addition thereto of lime and magnesia in addition to any lime or magnesia originally contained in the zinciferous material, the lime being added to the solution while the solution is at a temperature above about 20° C. but not above about 45° C., and agitating the solution after the addition of lime and while it is at said temperature for a period of at least two hours and until iron and at least the major portion of the silica and alumina present in the solution in gelatinous form are converted into readily-filterable, granular complexes of iron, lime and silica, and alumina, magnesia and silica.

3. In the method of recovering zinc from zinciferous materials involving the leaching of the zinciferous materials with a cyclic sulfuric acid solution to form a zinc-containing solution which subsequently is subjected to electrolysis for the electrodeposition of zinc therefrom; the improvement in reducing, prior to electrodeposition, the concentration in the solution of soluble salts which exert a harmful effect during electrolysis when present in too high a concentration, which comprises neutralizing the solution by the addition thereto of lime and magnesia in addition to any lime or magnesia originally contained in the zinciferous material, the lime being added to the solution while the solution is at a temperature below 50° C. but not substantially below 20° C., agitating the solution after the addition of lime and while it is at said temperature for a period of at least two hours and until iron and at least the major portion of the silica and alumina present in the solution in gelatinous form are converted into readily-filterable, granular complexes of iron, lime and silica, and alumina, magnesia and silica, and thereafter adding an oxidizing agent to the solution to oxidize ferrous iron remaining therein to the ferric state.

4. In the method of recovering zinc from zinciferous materials involving the leaching of the zinciferous materials with a cyclic sulfuric acid solution to form a zinc-containing solution which subsequently is subjected to electrolysis for the electrodeposition of zinc therefrom; the improvement in reducing, prior to electrodeposition, the concentration in the solution of soluble salts which exert a harmful effect during electrolysis when present in too high a concentration, which comprises neutralizing the solution by the addition thereto of lime and magnesia in addition to any lime or magnesia originally contained in the zinciferous material, the lime being added to the solution while the solution is at a temperature above about 20° C. but not above about 45° C., agitating the solution after the addition of lime and while it is at said temperautre for a period of at least two hours and until iron and at least the major portion of the silica and alumina that is present in the solution in gelatinous form are converted into readily-filterable, granular complexes of iron, lime and silica, and alumina, magnesia and silica, and thereafter adding an oxidizing agent to the solution to oxidize ferrous iron remaining therein to the ferric state.

5. In the method of recovering zinc from zinciferous materials involving the leaching of the zinciferous materials with a cyclic sulfuric acid solution to form a zinc-containing solution which subsequently is subjected to electrolysis for the electrodeposition of zinc therefrom; the improvement in reducing, prior to electrodeposition, the concentration in the solution of soluble salts which exert a harmful effect during electrolysis when present in too high a concentration, which comprises neutralizing the solution by the addition thereto of lime and magnesia in addition to any lime or magnesia originally contained in the zinciferous material, the lime being added to the solution at a temperature above 30° C. but not above about 45° C., agitating the solution after the addition of lime and while it is at said temperature for a period of at least three hours and until the temperature of the solution has dropped to below 30° C. and until iron and at least the major portion of the silica and alumina present in the solution in gelatinous form are converted into readily-filterable, granular complexes of iron, lime, and silica, and alumina, magnesia and silica, and thereafter adding an oxidizing agent to the solution to oxidize ferrous iron remaining therein to the ferric state.

6. In the method of recovering zinc from zinciferous materials involving the leaching of the zinciferous materials with a cyclic sulfuric acid solution to form a zinc-containing solution which subsequently is subjected to electrolysis for the electrodeposition of zinc therefrom; the improvement in reducing, prior to electrodeposition, the concentration in the solution of soluble salts which exert a harmful effect during electrolysis when present in too high a concentration, which comprises first adding magnesia to the solution to combine with alumina and silica to form an alumina-magnesia-silica complex, then, and after the temperature has dropped to below 50° C. but not substantially below 20° C., adding lime to complete the neutralization and to provide sufficient lime for combining with iron and silica present to form a granular, insoluble complex of iron, lime and silica.

7. In the method of recovering zinc from zinciferous materials involving the leaching of the zinciferous materials with a cyclic sulfuric acid solution to form a zinc-containing solution which subsequently is subjected to electrolysis for the electrodeposition of zinc therefrom; the improvement in reducing, prior to electrodeposition, the concentration in the solution of soluble salts which exert a harmful effect during electrolysis when present in too high a concentration, which comprises first adding magnesia to combine with alumina and silica present to form a granular, insoluble alumina-magnesia-silica complex, then, and after the temperature has dropped to at least 45° C. but not substantially below 20° C., adding lime to complete the neutralization and to provide sufficient lime for combination with iron and silica present in the solution to form a granular, insoluble complex of iron, lime and silica.

8. The improvement in the method of recovering zinc from zinciferous materials set forth in claim 1, in which at the end of the leaching of the zinciferous material the leaching solution contains at least ten grams per liter of acid.

9. In the method of recovering zinc from zinciferous materials involving the leaching of the zinciferous materials with a cyclic sulfuric acid solution to form a zinc-containing solution which subsequently is subjected to electrolysis for the electrodeposition of zinc therefrom; the improvement in reducing, prior to electrodeposition, the concentration in the solution of soluble salts which exert a harmful effect during electrolysis when present in too high a concentration, which comprises neutralizing the solution by the addition thereto of basic material including magnesia in addition to any magnesia originally contained in the zinciferous material, and thereafter agitating the solution while it is at a temperature below 50° C. but is not substantially above 20° C. for a period of at least two hours and until at least the major portion of the silica and the alumina present in the solution in gelatinous form are converted into a readily-filterable, granular complex of alumina, magnesia and silica.

10. The improvement in the method of recovering zinc from zinciferous materials set forth in claim 9, in which the agitation is begun while the temperature of the solution is above 30° C. and is continued for a period of at least three hours and until the temperature of the solution has dropped to below 30° C.

11. The improvement in the method of recovering zinc from zinciferous materials set forth in claim 9, in which an oxidizing agent is thereafter added to the solution to oxidize the ferrous iron remaining therein to the ferric state.

12. The improvement in the method of recovering zinc from zinciferous materials set forth in claim 9, in which the agitation is begun while the temperature of the solution is above 30° C. and is continued for a period of at least three hours and until the temperature thereof has dropped to below 30° C., and in which thereafter an odixizing agent is added to the solution to oxidize ferrous iron remaining therein to the ferric state.

JOHN T. ELLSWORTH.

REFERENCES CITED

The following references are of record in the file of this patent:

UNITED STATES PATENTS

| Number | Name | Date |
|---|---|---|
| 1,363,052 | Peterson | Dec. 21, 1920 |
| 1,843,006 | Steven et al. | Jan. 26, 1932 |

FOREIGN PATENTS

| Number | Country | Date |
|---|---|---|
| 361,258 | Germany | Oct. 12, 1922 |
| 592,354 | Germany | Feb. 7, 1934 |

OTHER REFERENCES

Ralston, Electrolytic Deposition and Hydrometallurgy of Zinc, pages 40–73.